US012561846B2

(12) United States Patent
Kang et al.

(10) Patent No.: US 12,561,846 B2
(45) Date of Patent: Feb. 24, 2026

(54) METHOD AND APPARATUS FOR CODING MACHINE VISION DATA USING FEATURE MAP REDUCTION

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Chae Hwa Yoo, Seoul (KR); Seung Wook Park, Yongin-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 350 days.

(21) Appl. No.: 18/371,730

(22) Filed: Sep. 22, 2023

(65) Prior Publication Data

US 2024/0013448 A1      Jan. 11, 2024

Related U.S. Application Data

(63) Continuation of application No. PCT/KR2022/004312, filed on Mar. 28, 2022.

(30) Foreign Application Priority Data

Mar. 31, 2021    (KR) ........................ 10-2021-0041562
Mar. 25, 2022    (KR) ........................ 10-2022-0037097

(51) Int. Cl.
G06T 9/00      (2006.01)
G06V 10/77      (2022.01)
G06V 10/82      (2022.01)

(52) U.S. Cl.
CPC .......... G06T 9/002 (2013.01); G06V 10/7715 (2022.01); G06V 10/82 (2022.01)

(58) Field of Classification Search
None
See application file for complete search history.

(56) References Cited

U.S. PATENT DOCUMENTS 10,095,977 B1 * 10/2018 Kim ..................... G06N 3/0455
10,402,658 B2 * 9/2019 Min ........................ G06N 3/09
(Continued)

FOREIGN PATENT DOCUMENTS

CN      110874631 A      3/2020
CN      107516129 B      6/2020
(Continued)

OTHER PUBLICATIONS

International Search Report and Written Opinion cited in corresponding international app No. PCT/KR2022/004312; Jul. 12, 2022; 10 pp.

*Primary Examiner* — Anand P Bhatnagar
(74) *Attorney, Agent, or Firm* — Lempia Summerfield Katz LLC

(57)      ABSTRACT

An apparatus and method for coding machine vision data using a reduction of feature map are disclosed. To reduce the size of a feature map extracted by a machine task-specialized deep learning model, a Video Coding for Machines (VCM) coding apparatus and a method are provided. The VCM coding apparatus and the method utilize a sparsification method that reduces redundancy in terms of space and channels of the feature map, and the VCM coding apparatus (Continued)

and the method also utilize a feature map decomposition method based on tensor decomposition.

17 Claims, 12 Drawing Sheets

(56) References Cited

U.S. PATENT DOCUMENTS

| | | | | |
|---|---|---|---|---|
| 10,402,977 | B1 * | 9/2019 | Kim | G06F 18/2148 |
| 10,896,356 | B2 * | 1/2021 | Dinerstein | G06T 3/4007 |
| 11,030,528 | B1 * | 6/2021 | Zhuo | G06N 3/0495 |
| 11,144,814 | B2 * | 10/2021 | Cha | G06N 3/0464 |
| 2016/0086078 | A1 * | 3/2016 | Ji | G06N 3/084 |
| | | | | 382/157 |
| 2020/0175352 | A1 * | 6/2020 | Cha | G06N 3/0464 |
| 2020/0356827 | A1 * | 11/2020 | Dinerstein | G06N 3/09 |
| 2021/0383165 | A1 | 12/2021 | Won et al. | |
| 2022/0083807 | A1 * | 3/2022 | Zhang | G06F 18/214 |
| 2025/0265808 | A1 * | 8/2025 | Han | G06V 10/764 |

FOREIGN PATENT DOCUMENTS

| | | | | | |
|---|---|---|---|---|---|
| CN | 111429463 | A | 7/2020 | | |
| KR | 10-2020-0044171 | A * | 4/2020 | | G06F 18/213 |
| KR | 20200044171 | A | 4/2020 | | |
| KR | 10-2020-0130105 | A * | 11/2020 | | G06F 18/213 |
| KR | 20200130105 | A | 11/2020 | | |

* cited by examiner

Input Image     conv1     conv2     conv3   conv4   conv5

METHOD AND APPARATUS FOR CODING MACHINE VISION DATA USING FEATURE MAP REDUCTION

CROSS-REFERENCE TO RELATED APPLICATIONS

This application is a Continuation of International Application No. PCT/KR2022/004312 filed on Mar. 28, 2022, which claims priority to Korean Patent Application No. 10-2021-0041562 filed on Mar. 31, 2021, and Korean Patent Application No. 10-2022-0037097 filed on Mar. 25, 2022, the entire disclosures of each of which are incorporated herein by reference.

TECHNICAL FIELD

The present disclosure relates to an apparatus and a method for coding machine vision data using a reduction of a feature map.

BACKGROUND

The statements in this section merely provide background information related to the present disclosure and do not necessarily constitute prior art.

Machines are gradually realized as utilizing the majority of video traffic following the explosion of machine vision applications, coupled with advances in deep learning technology and computing power. Machine-to-machine applications are expected to take up the largest portion of Internet video traffic in the future. Therefore, the manner of optimizing the information in video data used by machines can be a key factor in the innovation of video processing technologies and the commercialization of new solutions.

Existing video coding schemes are optimized for human vision, as the existing video coding schemes aim for the best picture or video quality under certain bit rate constraints. In contrast, with coding for machine vision, the reconstructed image/video does not necessarily have to hold high visual performance. The advent of technical areas with strict limits on latency and scale, which include connected vehicles, Internet of Things (IoT) devices, ultra-large video surveillance networks, smart cities, quality inspection, and the like ushered in a new paradigm for machine vision, exacting the need for new image/video coding methods targeting machine vision.

Accordingly, Moving Picture Expert Group (MPEG), a standardization organization has discussed the need for standardization for machine vision, resulting in Video Coding for Machines (VCM) proposed as a next-generation video coding apparatus to provide compression coding for machine vision data and compression coding for human-machine hybrid vision.

While there may be many variations on the structure of a VCM coding apparatus, the basic structure of a VCM coding apparatus is illustrated in FIG. 1. Upon receiving a video, which is the output of a sensor, the VCM encoder extracts features as information for machine vision, converts the features as needed, and then performs feature encoding. Further, the VCM encoder may refer to the encoded features when encoding the input image or video. Finally, the VCM encoder encodes the features for machine vision and the input image (or residual image) to generate a bitstream. The VCM encoder multiplexes the bitstreams each generated by encoding the features and video and transmits the bitstreams together.

The VCM decoder demultiplexes the transmitted bitstreams into a feature bitstream and a video bitstream and then decodes the features and video, respectively. When decoding the video, the VCM decoder may refer to the reconstructed features. After inverse conversion, the reconstructed features can be used simultaneously for machine vision and human vision.

Further, in the example of FIG. 1, an interface for a neural network (NN) may be utilized to apply a deep learning model at the VCM encoder to extract features and apply the deep learning model at the VCM decoder to perform tasks for machine vision, and the like.

In particular, a representative type of information for machine vision is a feature map that is extracted by a machine task-specialized deep learning model. If the VCM encoder transmits the feature map instead of transmitting the image/video, the computational load on the cloud server including the VCM decoder may be significantly reduced, with added benefits of personal information protection. However, feature maps, a stacked array of multiple channels, are inherently larger than normal images/videos. Additionally, the size of the output feature map of a particular layer of a deep learning model may be smaller than the input image/video. However, this benefit is counteracted by the issue that the corresponding layer changes as the deep learning model changes.

If the feature map is excessively larger than the input image/video, the aforementioned advantages of computational load reduction, privacy protection, and the like. may fade. Therefore, there is a need to devise an advanced method to reduce the size of the extracted feature map by reflecting the characteristics of the extracted feature map.

SUMMARY

The present disclosure seeks to provide a Video Coding for Machines (VCM) coding apparatus and a method for utilizing a sparsification method that reduces redundancy in terms of space and channels of the feature map and for utilizing a feature map decomposition method based on tensor decomposition in order to reduce the size of a feature map extracted by a machine task-specialized deep learning model.

At least one aspect of the present disclosure provides an encoding method performed by a machine vision encoding apparatus for encoding a feature map. The encoding method comprises extracting the feature map from an input image using a deep learning model. The feature map is generated from an intermediate layer of the deep learning model. The encoding method also comprises generating a reduced feature map by reducing a size of the feature map. The encoding method also comprises generating a converted feature map by converting a data type of the reduced feature map and rearranging the reduced feature map. The encoding method also comprises generating a bitstream by encoding the converted feature map using a video encoder.

Another aspect of the present disclosure provides a machine vision encoding apparatus. The apparatus comprises a feature extractor configured to use a deep learning model for extracting a feature map from an input image. The feature map is generated from an intermediate layer of the deep learning model. The apparatus also comprises a feature reducer configured to reduce a size of the feature map to generate a reduced feature map. The apparatus also comprises a pre-quantizer configured to quantize the reduced feature map to convert a data type of the reduced feature map. The apparatus also comprises a repacker configured to rearrange a quantized feature map in a video sequence form to generate a converted feature map. The apparatus also comprises a feature encoder configured to encode the converted feature map by using a video encoder to generate a bitstream.

Yet another aspect of the present disclosure provides a decoding method performed by a machine vision decoding apparatus. The decoding method comprises decoding a converted feature map using a video decoder from a bitstream. The decoding method also comprises reconstructing a reduced feature map by rearranging the converted feature map and by converting a data type of the rearranged converted feature map. The decoding method also comprises generating a reconstructed feature map by expanding a size of the reduced feature map. The reconstructed feature map corresponds to a feature map generated from an intermediate layer of a deep learning model in a machine vision encoding apparatus.

As described above, the present disclosure provides a VCM coding apparatus and a method, which utilize, for a feature map extracted by a deep learning model specialized for a machine task, a sparsification method that reduces redundancy in terms of space and channels of the feature map. The VCM coding apparatus and a method also utilize a feature map decomposition method based on tensor decomposition. Thus, the size of the feature map may be reduced.

Furthermore, the present disclosure provides a VCM coding apparatus and a method, which utilizes, for a feature map extracted by a deep learning model specialized for a machine task, as an integral reduction step of feature conversion, a sparsification method that reduces redundancy in terms of space and channels of the feature map. The VCM coding apparatus and method also utilize a feature map decomposition method based on tensor decomposition. Thus, feature map reduction may be used independently of a feature extraction step and a feature encoding step before and after the feature conversion.

DETAILED DESCRIPTION

Figure 1:
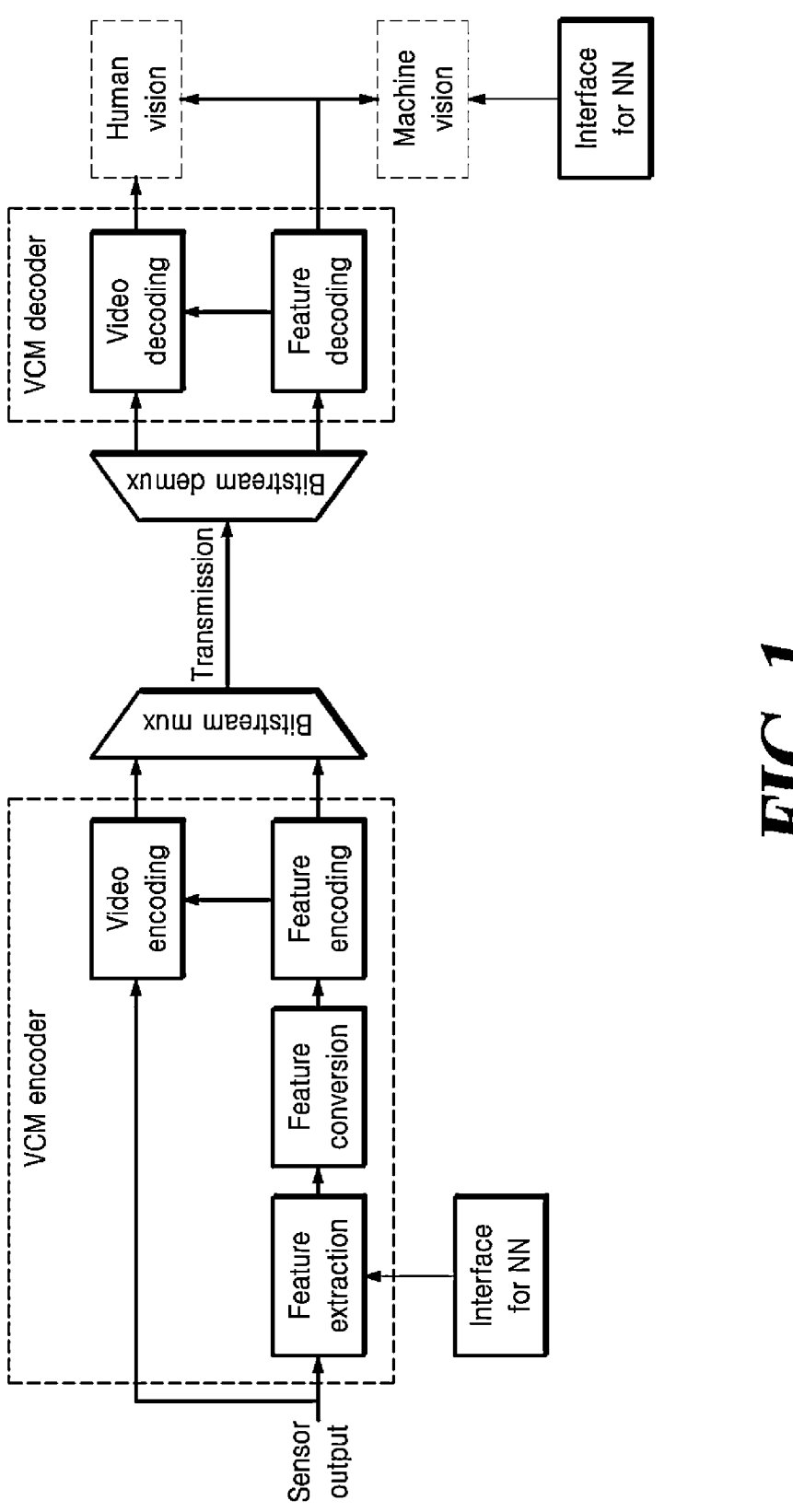
FIG. 1 is a block diagram conceptually representing a Video Coding for Machines (VCM) coding apparatus.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

This embodiments discloses an apparatus and a method of coding machine vision data using a reduction of a feature map. More specifically, to reduce the size of a feature map extracted by a machine task-specialized deep learning model, a Video Coding for Machines (VCM) coding apparatus and a method are provided. The VCM coding apparatus and the method utilize a sparsification method that reduces redundancy in terms of space and channels of the feature map and utilize a feature map decomposition method based on tensor decomposition.

Here, the VCM coding apparatus includes a VCM encoding apparatus and a VCM decoding apparatus.

Meanwhile, conventional codecs that encode and decode video signals to be optimized for human vision are denoted by a video encoder and a video decoder.

I. Intermediate Feature Map Coding (Intermediate Deep Feature Coding)

Figure 2:
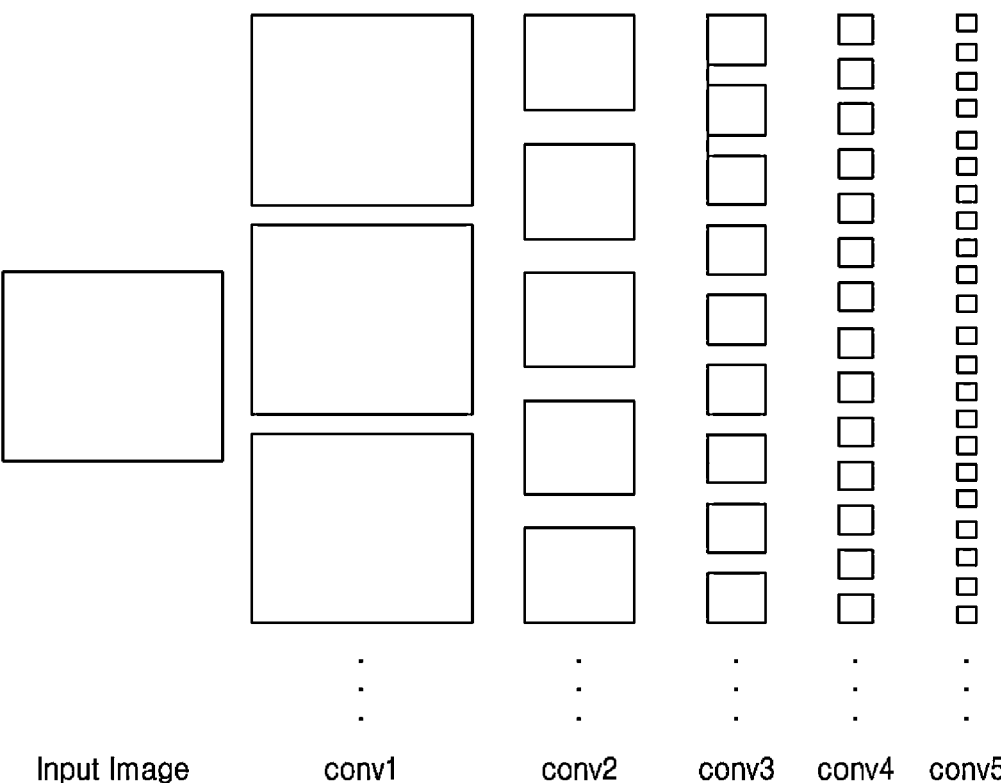
FIG. 2 is a diagram illustrating a layer-by-layer feature map of a deep learning model according to at least one embodiment of the present disclosure.

The multidimensional array outputted from each layer of a deep learning model having a hierarchical structure is commonly referred to as a feature, feature map, deep feature, or deep learning feature map. As shown in the example of FIG. 2, the feature map in each layer takes a stacked formation of spatially correlated two-dimensional arrays. In this case, the height H and width W of the two-dimensional array are referred to as the height and width of the corresponding feature map, and the number of stacked two-dimensional arrays is referred to as the number of channels C of the relevant feature map. In a convolutional neural network (CNN) structure, which is known to be suitable for image processing, the deeper the layer, the smaller the height and width of the feature map generally become and the greater the size of the channel due to pooling. Intuitively, a single-channel two-dimensional feature map may be regarded as a single frame, and the stacked feature maps may be regarded as a continuous video sequence.

Figure 3:
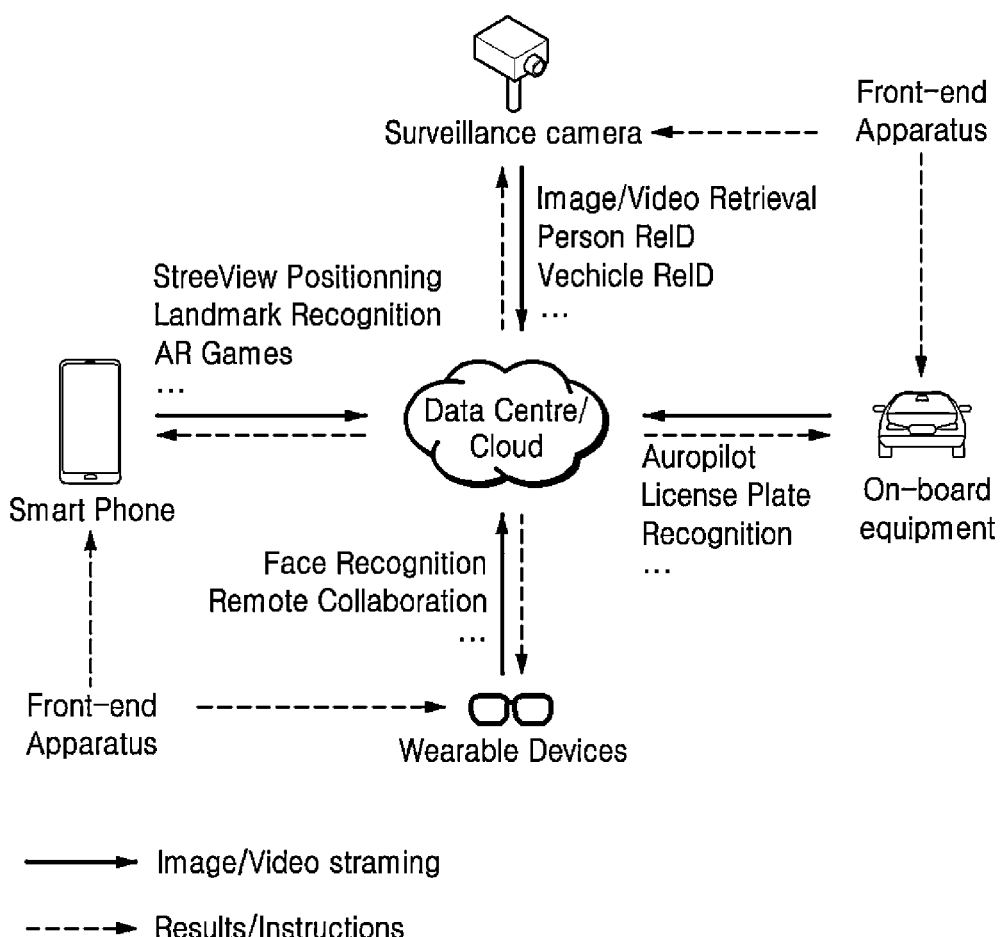
FIG. 3 is a diagram conceptually illustrating the operation of a front end and a cloud server.

With the development of network infrastructures, cloud-based applications have recently emerged. In particular, a front-end device obtains information from a user or the physical world and then transmits the obtained information to a cloud server (i.e., a data center), which then uses the obtained information to perform further processing and analysis. Front-end devices deployed in the physical world, such as security surveillance cameras, wearable devices, and the like, may acquire massive amounts of data that are sent to the cloud server for visual analysis, as illustrated in FIG. 3. Many deep learning-based vision models can be applied to this cloud-based paradigm, e.g., in i) autonomous vehicles for pedestrian detection, person/vehicle identification, and license plate recognition, ii) portable devices, e.g., smartphones, smart glasses, and others' software applications for face recognition, landmark detection, and object detection, and iii) surveillance cameras for surveillance image/video retrieval and person/vehicle recognition.

In such a cloud-based paradigm, the compression and transmission of video between the front end and the cloud server may rely on a traditional 'compress-then-analyze' approach. The front-end device captures and compresses the visual data, and the front-end device also sends the coded bitstream to the cloud server. The cloud server decodes the bitstream and performs shape extraction and visual analysis. However, in scenarios such as video surveillance and IoT, a large number of front-end devices may generate millions of bitstreams simultaneously. Therefore, on the front-end side, visual compression at the video signal level can be a big transmission burden and generally an uncontrollable scale. On the cloud server side, the computational load of many deep learning models running simultaneously for feature extraction can be a significant challenge.

On the other hand, in the 'analyze-then-compress' approach, where the features extracted at the front end are compressed and sent to the cloud server, since the extracted features are used for task analysis instead of the visual signals, the 'analyze-then-compress' approach can be a viable alternative to the 'compress-then-analyze' approach described above. For deep learning-based features, the top layer, i.e., the deepest layer of the deep learning model is usually sent to the cloud because the deepest layer is more compact than the lower layers, i.e., the shallow layers, and can be used immediately for analysis. In such a scenario, lightweight tasks, such as feature-to-feature comparisons, are performed on the cloud server, while heavy-duty tasks such as feature extraction are distributed to the front end. This feature transfer is also beneficial for privacy protection. Compared to the transmission of visual signals, which may easily reveal personal information, feature transmission can avoid the disclosure of visible information.

On the other hand, since deep learning models are designed and trained for specific tasks, and the top layer features are very abstract and task-specific, compressing the top layer features may be difficult to generalize. Namely, the compressed features under standardization may be difficult to apply to other scenarios, which may be an obstacle to make a standard for feature compression with deep learning models.

Considering the above issues, an intermediate deep feature compression approach exists to reduce the computational load on the cloud server while maintaining the availability of features. This approach is considered to be a compromise between the extremes of 'analysis-then-compress' and 'compress-then-analysis' as described above and can provide a good balance between computational load, communication cost, and generalization ability.

Since deep learning models typically have a hierarchical structure, deep learning models may be considered a combination of stacked feature extractors rather than a single feature extractor. Features in the top layer are abstract and task-specific based on a large receptive field, while features in the bottom layer have a small receptive field and encode a lot of location information in a 2D feature map, which may be suitable for broader analysis. Thus, when compressing and transmitting features from the middle layer instead of the final layer, the cloud server has the flexibility to request appropriate features depending on the task being performed at the front end.

Figure 4:
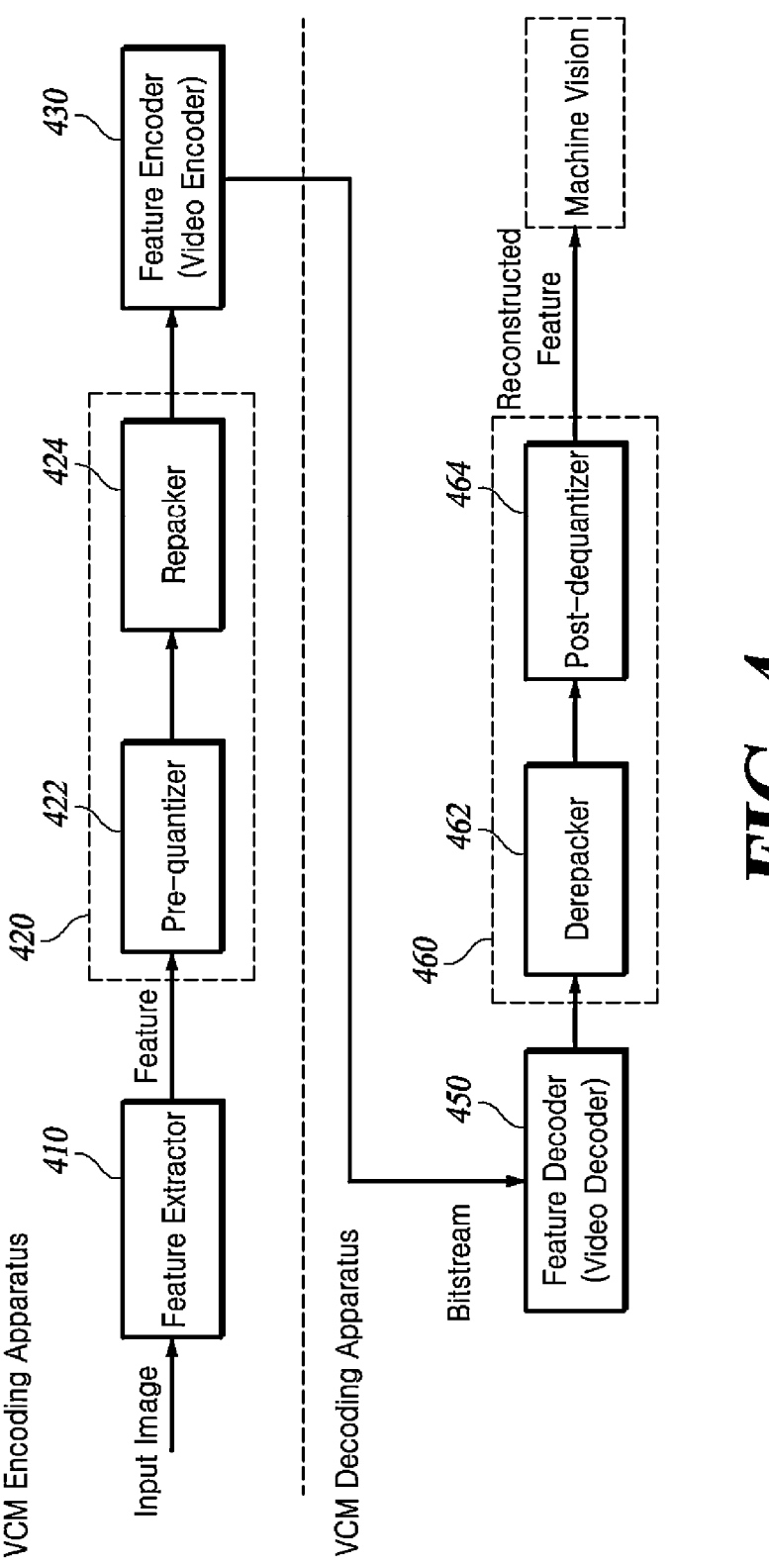
FIG. 4 is a block diagram conceptually illustrating a VCM coding apparatus performing intermediate deep feature compression, according to at least one embodiment of the present disclosure.

Intermediate deep feature coding is very important in the pipeline of the VCM standard, which may be applied in the structure of the VCM coding apparatus illustrated in FIG. 1 to the feature conversion, feature encoding, and feature decoding in this order. Hereinafter, intermediate deep feature coding is described with reference to FIG. 4. In FIG. 4, the components that perform video encoding and video decoding of the input image are not shown because these components are not particularly relevant to the present embodiments.

In the following description, a feature map refers to an intermediate deep feature map that is the output of an intermediate layer of a deep learning model.

FIG. 4 is a block diagram conceptually illustrating a VCM coding apparatus performing intermediate deep feature compression, according to at least one embodiment of the present disclosure.

The VCM encoding apparatus includes all or part of a feature extractor 410, a feature converter 420, and a feature encoder 430. Further, the VCM decoding apparatus includes all or part of a feature decoder 450 or a feature inverse converter 460.

First, the feature encoder 430 and the feature decoder 450 may be implemented using conventional video coding apparatuses.

The feature extractor 410 in the VCM encoding apparatus extracts from the input video a feature map of the task for machine vision, based on a deep learning model. Further, the deep learning model in the feature extractor 410 may perform the machine vision task, such as generating an analysis result of the machine vision task.

The deep learning model in the feature extractor 410 may be any neural network model that can generate a feature map suitable for analysis in the machine vision task. For example, the deep learning model may be a CNN-based model implemented with multiple encoding layers. Here, one encoding layer may include a convolutional layer and a pooling layer.

The feature converter 420 includes a pre-quantizer 422 and a repacker 424 to convert data types for the feature map and rearrange feature map channels, and the like.

The feature map extracted by the deep learning model may have a number type that is incompatible with the input of a conventional video coding apparatus. Therefore, to ensure input compatibility with the feature encoder 430, the pre-quantizer 422 first performs pre-quantization. For example, the feature maps of a typical deep learning model may be of the float32 type, while conventional video coding apparatuses utilize integer inputs of 8 or more bits. Furthermore, different pre-quantization methods may be used depending on the distributional analysis of the intermediate deep feature maps.

The repacker 424 repacks the pre-quantized N feature maps $R^{N \times H \times W \times C}$ (where N is a natural number) into a video sequence-compatible format, $R^{H' \times W' \times NC}$, to fit the input format of the video coding apparatus. Here, H and W are the height and width of the 2D feature map, and C is the number of channels. H'×W' is obtained from the size of the original feature map, H×W, expanded by the padding to fit the input frame size of the video coding apparatus. R represents the real number. Additionally, since H×W×C is the feature map extracted by the deep learning model from one frame of the input video, N×H×W×C equals the feature maps extracted from N frames.

In the following description, a feature map is denoted by $F \in R^{H \times W \times C}$ and a 2D feature map constituting the feature map is denoted by $f \in R^{H \times W}$.

In another embodiment, the repacker 424 may repack the pre-quantized N feature maps $R^{N \times H \times W \times C}$ (where N is a natural number) into one frame. For example, where the feature encoder 430 is a conventional video coding apparatus, as described above, the channel-specific feature maps may be repacked into a single superframe to use only the intra-prediction mode instead of the inter-prediction mode. For such a repacked super frame, only intra prediction of the video coding apparatus may be used to achieve better compression efficiency. Hereinafter, this repacking process is referred to as frame packing.

The feature encoder 430 encodes the converted feature map and thus generates a bitstream.

The feature decoder 450 in the VCM decoding apparatus decodes from the bitstream the converted feature map.

The feature inverse converter 460 includes a derepacker 462 and a post-dequantizer 464 to apply a feature map inverse conversion to the bitstream, which is the reverse process of the feature map conversion by the VCM encoding apparatus.

The derepacker 462 converts the feature map having been repacked into the video sequence-compatible format, back to the original feature map size.

The post-dequantizer 464 dequantizes a feature map having integer values to a floating point type. These reconstructed feature maps can be utilized for analyzing machine vision tasks, as described above.

There is a concern that intermediate deep feature maps when compressed and transmitted instead of visual signals may be larger than the video/image stream. However, it is known that features in higher layers of a deep learning model typically have a smaller compression size than features in lower layers, and in particular, the closer the distance to the top layer gets, the better the compression ratio of the corresponding features gets over the original visual information. In other words, some kinds of features may use less bandwidth than an image/video bitstream. Therefore, in such cases, transmitting an intermediate deep feature map makes sense in terms of transmission bandwidth efficiency.

On the other hand, even if the intermediate deep feature map cannot be compressed to a size smaller than the image/video bitstream, it is still significant to transmit the feature map. In many applications, computational resources are more expensive than bandwidth, so it can be more significant to use intermediate deep feature map transmission to disperse the computational load from the cloud server to the front-end devices.

II. Intermediate Deep Feature Map Reduction (Intermediate Deep Feature Reduction)

Figure 5:
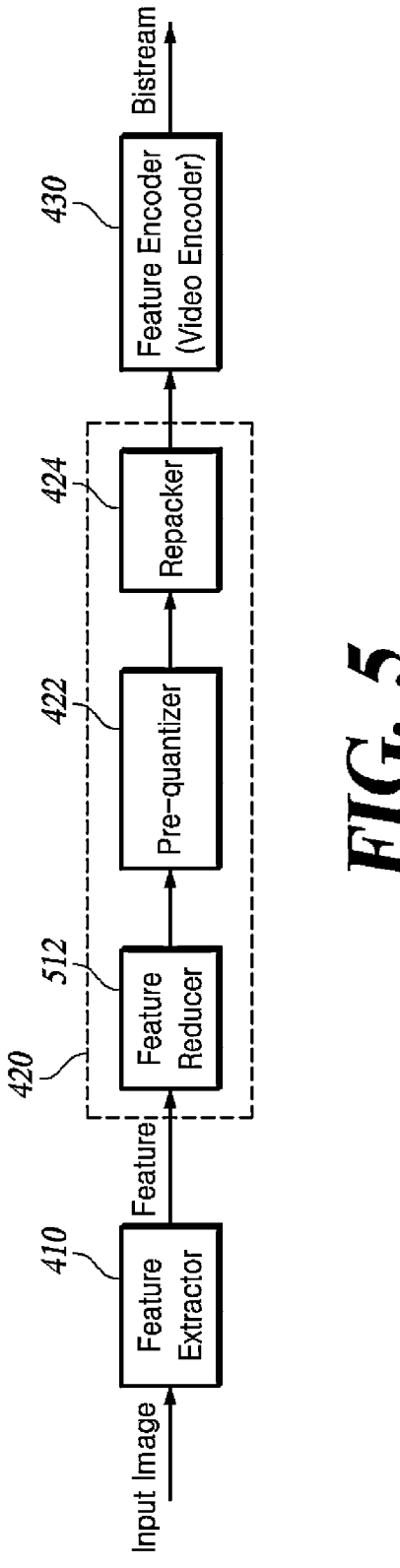
FIG. 5 is a block diagram conceptually illustrating a VCM encoding apparatus utilizing intermediate deep feature map reduction, according to at least one embodiment of the present disclosure.
Figure 6:
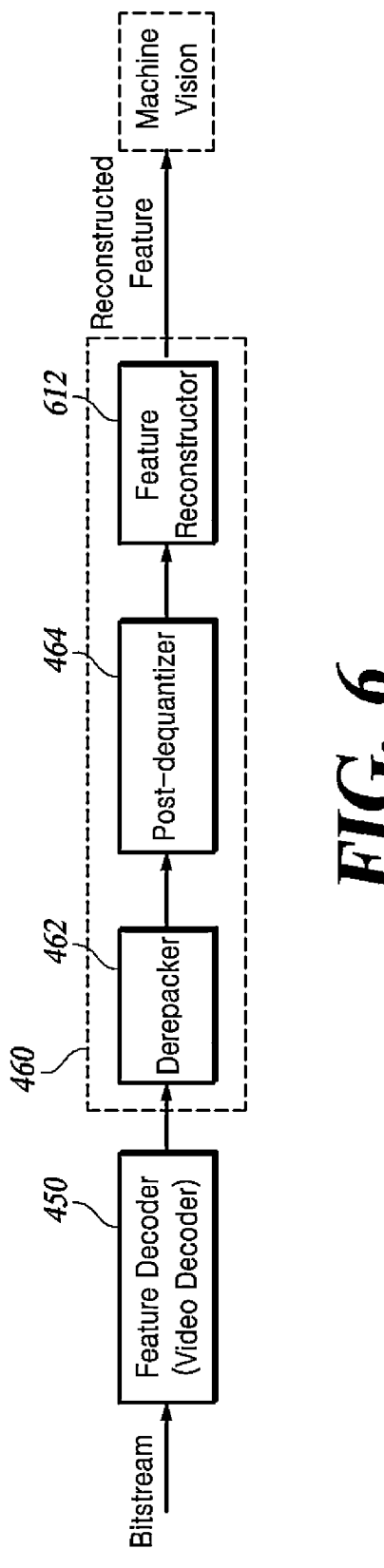
FIG. 6 is a block diagram conceptually illustrating a VCM decoding apparatus utilizing intermediate deep feature map reconstruction, according to at least one embodiment of the present disclosure.

The following describes, with reference to FIGS. 5 and 6, a method of reducing an intermediate deep feature map in a feature conversion step and a method of reconstructing the intermediate deep feature map in a feature inverse conversion step.

FIG. 5 is a block diagram conceptually illustrating a VCM encoding apparatus utilizing intermediate deep feature map reduction, according to at least one embodiment of the present disclosure.

Exception for a feature reducer 512, which is new to the illustration of FIG. 5, the remaining components are the same as the components of the VCM encoding apparatus illustrated in FIG. 4. As mentioned above, since the feature conversion step is predicated on utilizing an existing video coding apparatus for feature encoding, before pre-quantizing the feature map, the feature reducer 512 may further perform various feature map reduction methods to reduce the size of the original feature map, to improve the encoding efficiency of the feature map.

For feature map reduction, the feature reducer 512 may use two methods, such as feature map reduction based on feature map sparsification and feature map reduction based on tensor decomposition. By using these two methods separately or simultaneously, the feature reducer 512 can maximize feature map reduction. Furthermore, when the two methods are used together, there are no restrictions on the order of use. The methods for feature map reduction according to this embodiment may also be used in combination with a separate preprocessing method, such as frame packing of the feature map as described above.

FIG. 6 is a block diagram conceptually illustrating a VCM decoding apparatus utilizing intermediate deep feature map reconstruction, according to at least one embodiment of the present disclosure.

Exception for a feature reconstructor 612, which is new to the illustration of FIG. 6, the remaining components are the same as the components of the VCM decoding apparatus illustrated in FIG. 4. As mentioned above, since the feature inverse conversion step is predicated on utilizing an existing video coding apparatus for feature decoding, the feature reconstructor 612 that is relevant to the feature reducer 512 reconstructs the original feature map from the post-dequantized feature map, i.e., the reduced feature map. The specific feature map reconstruction method here may rely on such feature map reduction method as used by the VCM encoding apparatus.

The following describes feature map reduction methods performed by feature reducer 512 and feature reconstructor 612. While FIGS. 5 and 6 illustrate the use of a conventional video coding apparatus for feature encoding/decoding, the feature map reduction methods described herein are not necessarily limited to using the same. For example, the feature map reduction methods according to the present embodiment may be utilized to reduce the size of an extracted feature map regardless of the deep learning model for feature extraction or coding method.

First, among the feature map reduction methods, feature map reduction based on feature map sparsification utilizes sparsity in terms of space or channels present in the feature map.

When a deep learning model generates an intermediate deep feature map, some regions and some channels may be highly activated, depending on the spatial characteristics of the input image/frame or the characteristics of the filter being trained. On the other hand, a lowly activated region, even if it is inputted to the next layer, induces successively low activations and finally has a small impact on the judgment of the last layer of the deep learning model. Therefore, even with zeroing sparsification of the value of the region that outputs such a small activation, the size of the feature map itself can be reduced without significantly degrading the judgment performance of the deep learning model. In other words, the coding efficiency of the feature map can be improved based on feature map sparsification which sparsifies the feature map regions that are activated lower than a certain threshold value.

Figure 7:
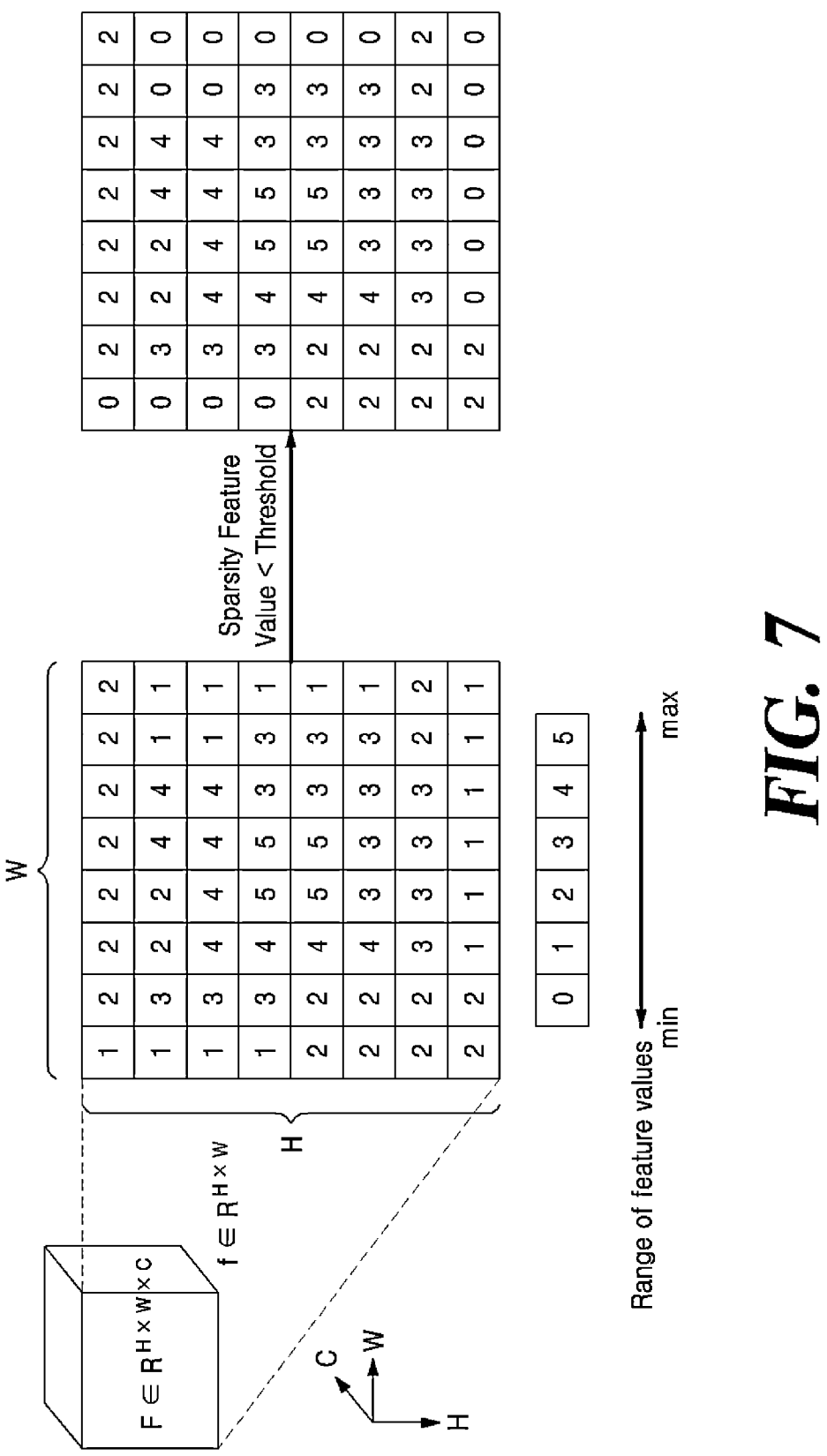
FIG. 7 is a diagram illustrating a feature map reduction method based on feature map sparsification, according to at least one embodiment of the present disclosure.

The following describes, using the example of FIG. 7, a method performed by the feature reducer 512 for shrinking a feature map based on its sparsity in terms of space.

FIG. 7 is a diagram illustrating a feature map reduction method based on feature map sparsification, according to at least one embodiment of the present disclosure.

The feature reducer 512 sparsifies regions that output low activations based on their degree of activation within a single 2D feature map $f \in R^{H \times W}$ that constitutes the intermediate deep feature map $F \in R^{H \times W \times C}$. For example, when the regions (e.g., pixels) of the 2D feature map f of a particular channel of the feature map are represented numerically based on their feature values, the feature reducer 512 sets the feature values of regions lower than a certain threshold to completely zero. In the example of FIG. 7, if the threshold is set to 1.5, regions labeled as 1 may be set to 0. By setting this appropriate threshold, the performance of the deep learning model is not significantly affected by setting the feature values of regions lower than this threshold to zero. The feature reducer 512 may perform this feature map sparsification in terms of space for C 2D maps $\{f_1, f_2, \ldots, f_C\}$ amounting to all feature map channels, or for some 2D maps $\{f_1, f_2, \ldots, f_{C'}\}$ (C'<C).

Figure 8:
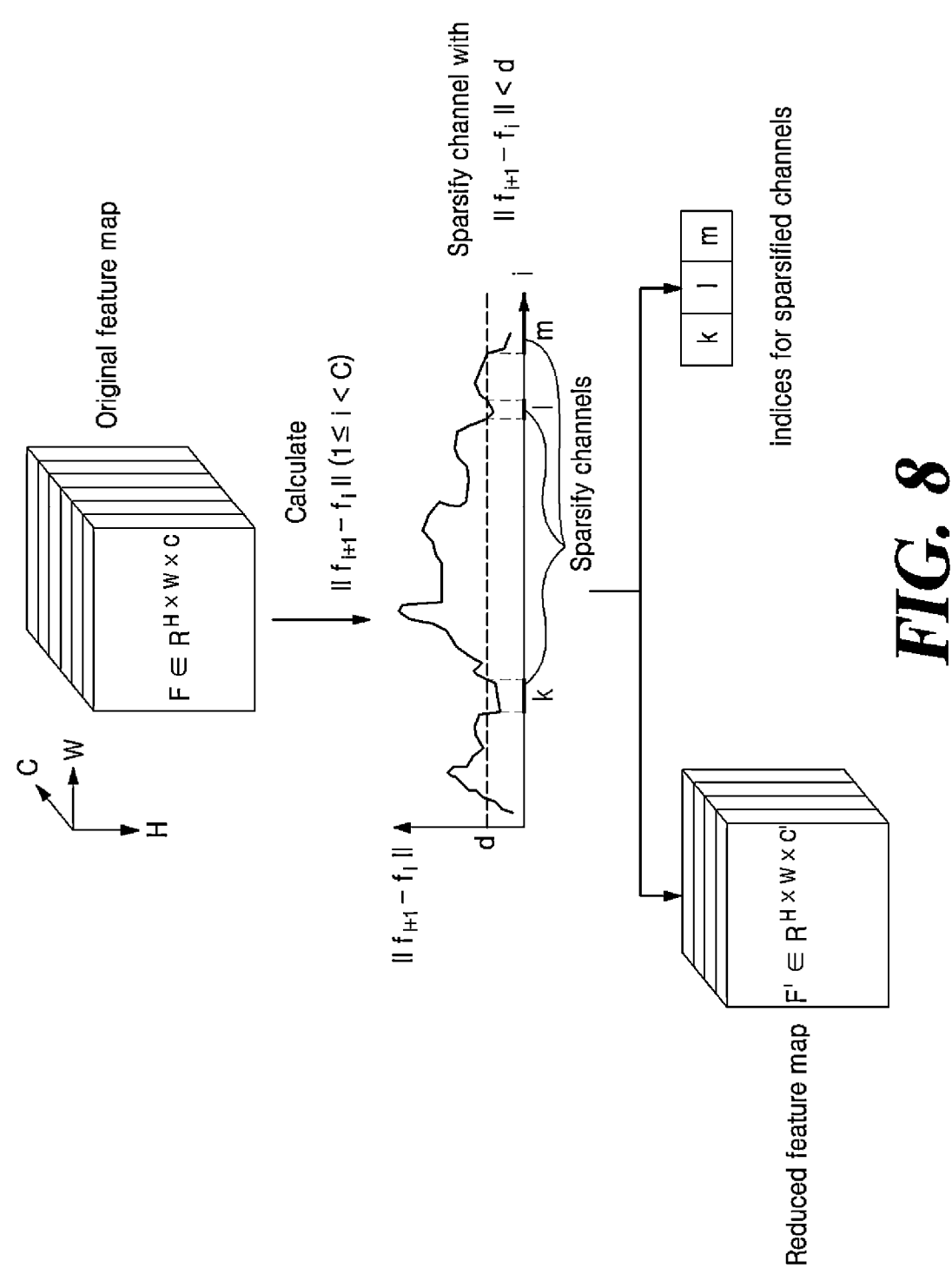
FIG. 8 is a diagram illustrating a feature map reduction method based on feature map sparsification, according to another embodiment of the present disclosure.

The following describes, using the example of FIG. 8, how the feature reducer 512 reduces the feature map based on its sparsity in terms of channels.

FIG. 8 is a diagram illustrating a feature map reduction method based on feature map sparsification, according to another embodiment of the present disclosure.

The feature reducer 512 may be responsive to the similarity between the 2D feature maps of two adjacent channels by a certain channel stride S, i.e., the two feature maps being distanced by less than a certain threshold for reducing redundancy between the two 2D feature maps by setting one 2D feature map to zero or deleting one channel entirely. Thus, the number of channels in the original feature map may be reduced, and thus the size of the overall feature map may be reduced.

For the original feature map, the feature reducer 512 calculates a distance $\|f_{i+S} - f_i\|$ ($1 \le i \le C - S$) between two 2D feature maps having a certain channel stride S. The distance may be a norm, such as L1, L2, and the like. For example, in the example of FIG. 8, the channel stride S is set to 1. The feature reducer 512 considers two 2D feature maps that have a distance less than a certain threshold d to be very similar feature maps. After selecting all pairs of channels with similar 2D feature maps, the feature reducer 512 may, for each pair, sparsifies all values of the 2D feature map of the front (or back) channel of the two 2D feature maps to zero. Alternatively, the feature reducer 512 may completely delete one channel for each pair, as illustrated in FIG. 8. The feature reducer 512 may use only the 2D feature maps of the non-similar channels to generate an intermediate deep feature map F' with a reduced overall number of channels.

The VCM encoding apparatus checks if sparsified channels exist. If yes, the VCM encoding apparatus decodes the channel stride S value and the 2D feature map of each sparsified channel and then transmits the decoded channel stride S value and the decoded 2D feature map of each sparsified channel to the VCM decoding apparatus. Since all values of the 2D feature map of each sparsified channel are zero, the VCM encoding apparatus can easily encode the 2D feature map of each sparsified channel, which can greatly improve the coding efficiency. Alternatively, the VCM encoding apparatus may checks if deleted channels exist. If yes, the VCM encoding apparatus may encode the channel stride S value and the index of each deleted channel and then may transmit the encoded channel stride S value and the encoded index of each deleted channel to the VCM decoding apparatus. Instead of encoding a 2D feature map of size H×W for the deleted channel, the VCM encoding apparatus may only encode an integer value corresponding to the index, which can greatly improve the coding efficiency.

Meanwhile, for a sparsified or deleted channel, the feature reconstructor 612 in the VCM decoding apparatus may refer to the reconstructed reduced feature map, the reconstructed channel stride S value, or the deleted channel index information. For a sparsified channel where all values are reconstructed to zero, the VCM decoding apparatus reconstructs the original feature map before the reduction by copying the 2D feature map of the channel before (or after) the stride S to the location of the sparsified channel. Alternatively, for a deleted channel, the VCM decoding apparatus references the deleted channel index information and thus copies the 2D feature map of the channel before (or after) the stride S to the location of the deleted channel to reconstruct the original feature map before reduction.

The resultant reconstructed feature map is an array having the same size as the original feature map, and the VCM decoding apparatus may then use the reconstructed feature map for analysis in a machine vision task.

In another embodiment, the VCM encoding apparatus may multiply the element values $c_i$ contained in the 1×C vector representing the weights of each channel by the corresponding feature map $f_i$ and then may compress and transmit the feature map. When decoding the feature map, the VCM decoding apparatus may generate a reconstructed feature map by dividing the received feature map by $c_i$. The $c_i$ may be obtained from an attention model based on deep learning or obtained from a squeeze and excitation (SE) block of an SE model based on deep learning.

Hereinafter, an example of a feature map reduction method using tensor decomposition is described.

A feature map in the form of a multidimensional array as described above may be decomposed into a plurality of low-dimensional simple tensors by using tensor decomposition. In this case, the total size of the decomposed tensors may be reduced from the size of the original feature map.

On the other hand, the feature map reduction is not limited to a particular tensor decomposition method, and various tensor decomposition methods, such as matrix decomposition (e.g., Singular Value Decomposition SVD, CUR factorization, QR factorization, and the like), Higher Order SVD (HOSVD), may be applied in addition to the examples described below. After applying the tensor decomposition method, the VCM encoding apparatus may utilize the decomposed low-dimensional tensors for feature encoding in place of the original feature map.

Figure 9:
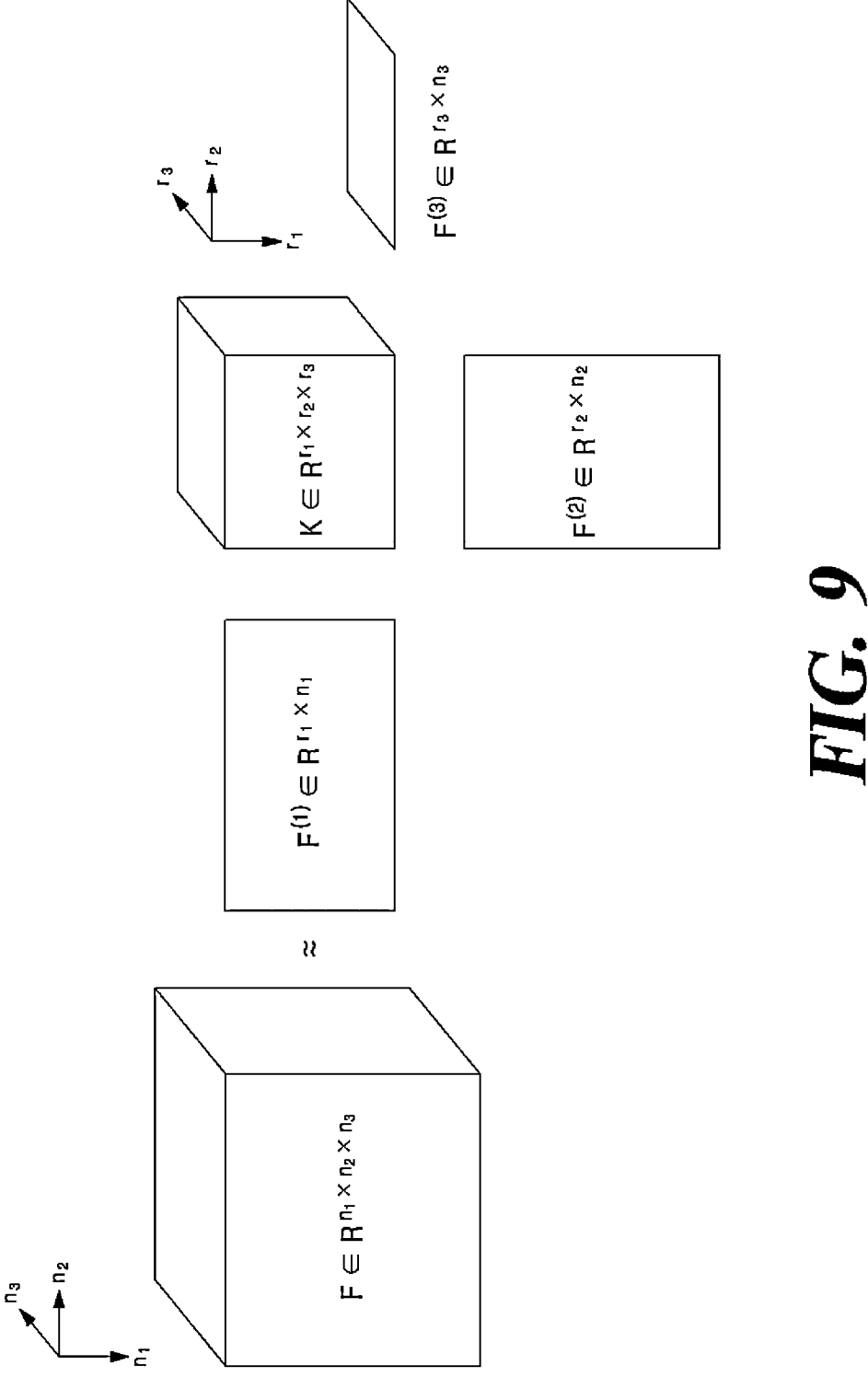
FIG. 9 is a diagram illustrating a feature map reduction method using Tucker decomposition, according to at least one embodiment of the present disclosure.

As an example of tensor decomposition, FIG. 9 describes a method performed by the feature reducer 512 for reducing a feature map based on a Tucker decomposition.

FIG. 9 is a diagram illustrating a feature map reduction method using Tucker decomposition, according to at least one embodiment of the present disclosure.

The feature reducer 512 may decompose an intermediate deep feature map $F \in R^{n_1 \times n_2 \times n_3}$ for a single image into one kernel tensor $K \in R^{r_1 \times r_2 \times r_3}$ and three factor matrices $F(C) \in R^{r_i \times n_i}$ ($i \in \{1,2,3\}$) by using Tucker decomposition, as illustrated in FIG. 9. Here, $r_i$ is represented by i-rank, and when the feature map is generated as a $F^* \in R^{n_i \times n_1 \cdots n_{i-1} n_{i+1} \cdots n_3}$ shaped matrix, $r_i$ represents the rank of this matrix. With one kernel tensor and three factor matrices, the feature map F may be approximated by an operation on the tensors, as shown in Equation 1.

$$F \approx K x_1 F^{(1)} x_2 F^{(2)} x_3 F^{(3)} \qquad \text{[Equation 1]}$$

Here, the operators $x_1$, $x_2$, and $x_3$ may be expressed as in Equation 2.

$$\left(K \times_1 F^{(1)}\right)(n_1, r_2, r_3) = \sum_{i_1=1}^{r_1} K(i_1, r_2, r_3) F^{(1)}(i_1, n_1) \qquad \text{[Equation 2]}$$

$$\left(K \times_2 F^{(2)}\right)(r_1, n_2, r_3) = \sum_{i_2=1}^{r_2} K(r_1, i_2, r_3) F^{(2)}(i_2, n_2)$$

$$\left(K \times_3 F^{(3)}\right)(r_1, r_2, n_3) = \sum_{i_3=1}^{r_3} K(r_1, r_2, i_3) F^{(3)}(i_3, n_3)$$

Following the Tucker decomposition, the data size $n_1 n_2 n_3$ of the original feature map is reduced to '$r_1 r_2 r_3 + r_1 n_1 + r_2 n_2 + r_3 n_3$'.

The VCM encoding apparatus may use a video encoder to encode each of the decomposed tensors K, $F^{(1)}$, $F^{(2)}$, and $F^{(3)}$ and then may multiplex and transmit the generated bitstreams to the VCM decoding apparatus.

On the other hand, the VCM decoding apparatus uses a video decoder to decode the bitstreams of decomposed tensors and then applies the decoded tensors to the derepacker 462 and the post-dequantizer 464, as illustrated in FIG. 4. The VCM decoding apparatus may use the dequantized decomposed tensors to reconstruct the original feature map according to Equation 1.

Figure 10:
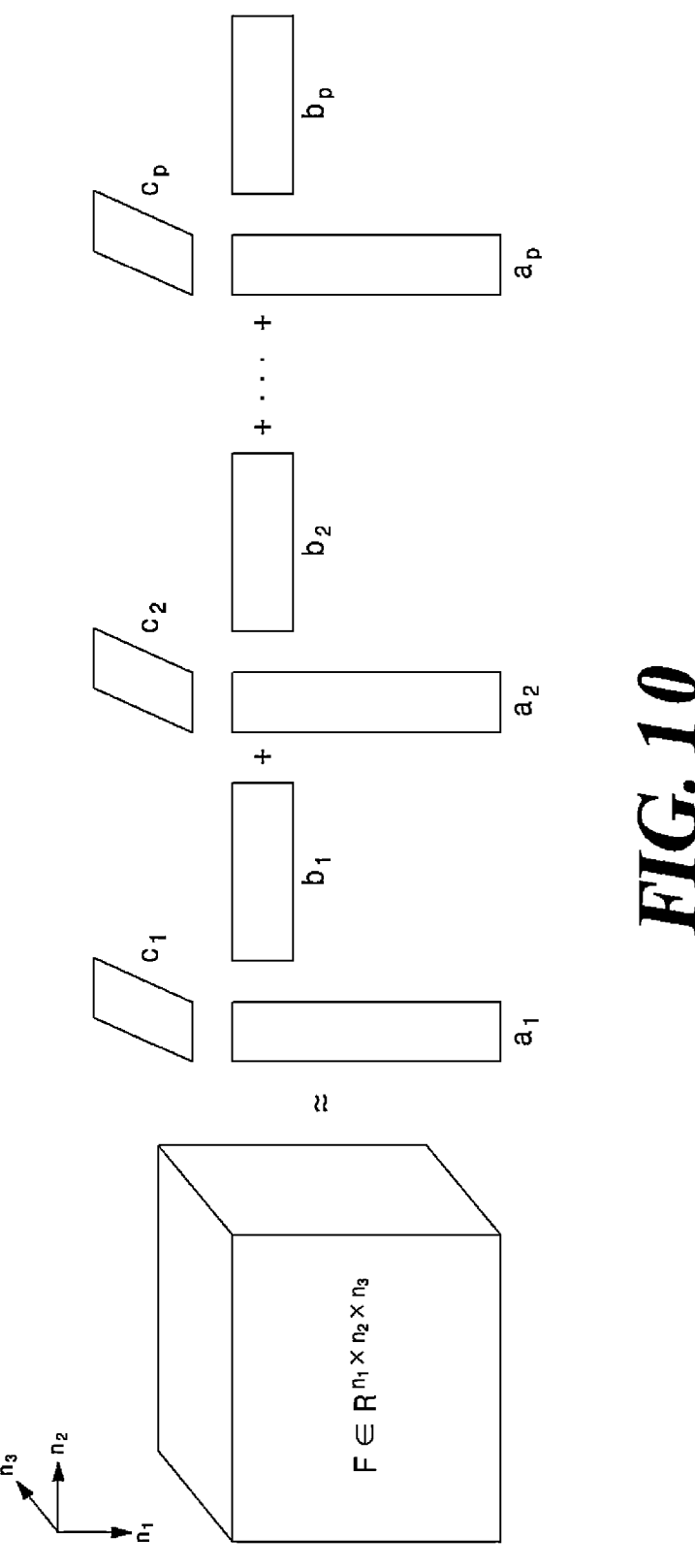
FIG. 10 is a diagram illustrating a feature map reduction method utilizing Canonical Polyadic (CP) decomposition, according to at least one embodiment of the present disclosure.

As another embodiment of tensor decomposition, the example of FIG. 10 describes how the feature reducer 512 reduces a feature map based on a Canonical Polyadic (CP) decomposition.

FIG. 10 is a diagram illustrating a feature map reduction method utilizing a CP decomposition, according to at least one embodiment of the present disclosure.

The feature reducer 512 may use CP decomposition to decompose the intermediate deep feature map $F \in R^{n_1 \times n_2 \times n_3}$ into a linear combination of rank 1 tensors, as illustrated in FIG. 10. For example, the feature map F may be approximated based on P rank 1 tensors (where P is a natural number), as shown in Equation 3.

$$F \approx \sum_{p=1}^{P} a^p \ o \ b^p \ o \ c^p \qquad \text{[Equation 3]}$$

Here, the operator o denotes the outer product.

The VCM encoding apparatus generates the tensors A, B, and C by concatenation of rank 1 tensors of the same size, as shown in Equation 4, and then encodes the tensors A, B, and C.

$$A = [a_1, a_2, \ldots, a_P] \in R^{n_1 \times P}$$

$$B = [b_1, b_2, \ldots, b_P] \in R^{n_2 \times P}$$

$$C = [c_1, c_2, \ldots, c_P] \in R^{n_3 \times P} \qquad \text{[Equation 4]}$$

Based on the CP decomposition, the data size $n_1 n_2 n_3$ of the original feature map is reduced to '$(n_1 + n_2 + n_3)P$'.

In another embodiment, the VCM encoding apparatus may encode P decomposed rank 1 tensors.

The VCM encoding apparatus transmits the bitstream obtained by encoding the decomposed tensors to the VCM decoding apparatus.

On the other hand, the VCM decoding apparatus uses a video decoder to decode the bitstream of decomposed tensors and applies the decoded tensors to the derepacker 462 and the post-dequantizer 464, as illustrated in FIG. 4. The VCM decoding apparatus may use the dequantized decomposed tensors to reconstruct the original feature map according to Equation 3.

In another embodiment, the VCM encoding apparatus may encode tensors that combine only P' (<P) rank 1 tensors and may transmit the encoded tensors to the VCM decoding apparatus. The VCM decoding apparatus may reconstruct the original feature map by using the decoded P' rank 1 tensors.

Figure 11:
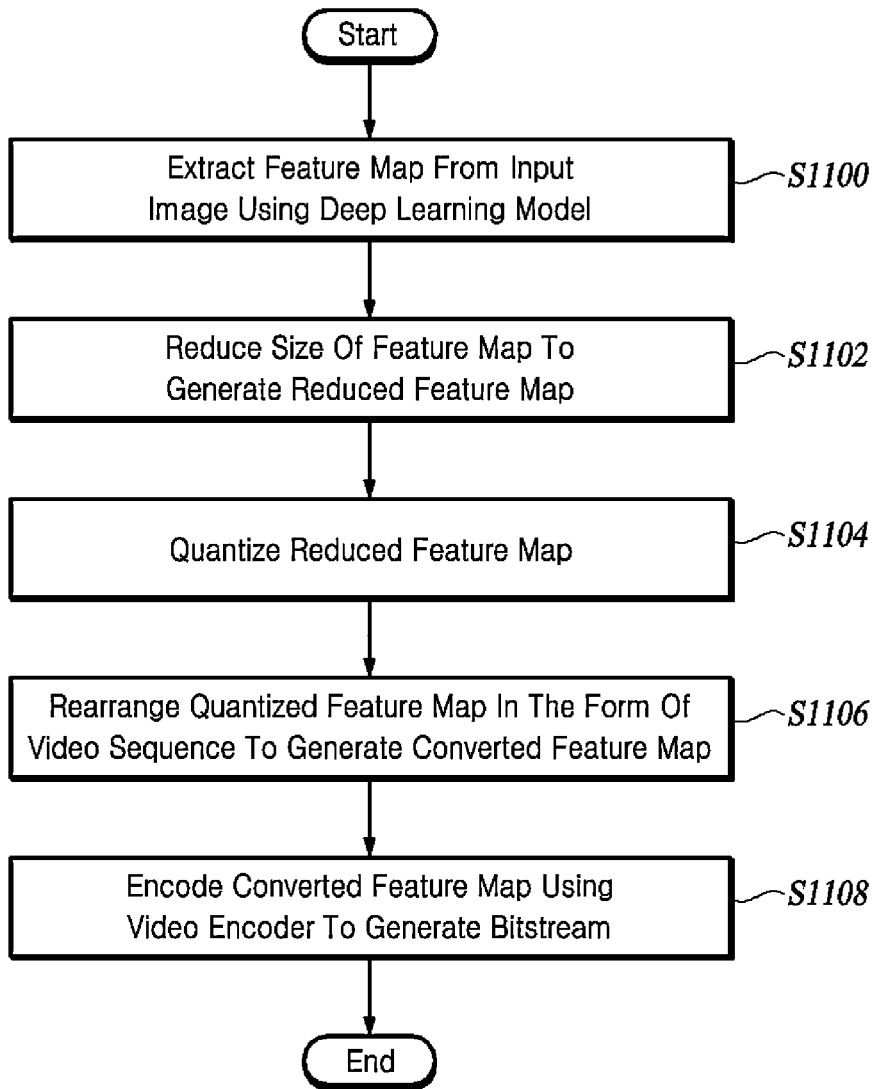
FIG. 11 is a flowchart of a VCM encoding method utilizing intermediate deep feature map reduction, according to at least one embodiment of the present disclosure.
Figure 12:
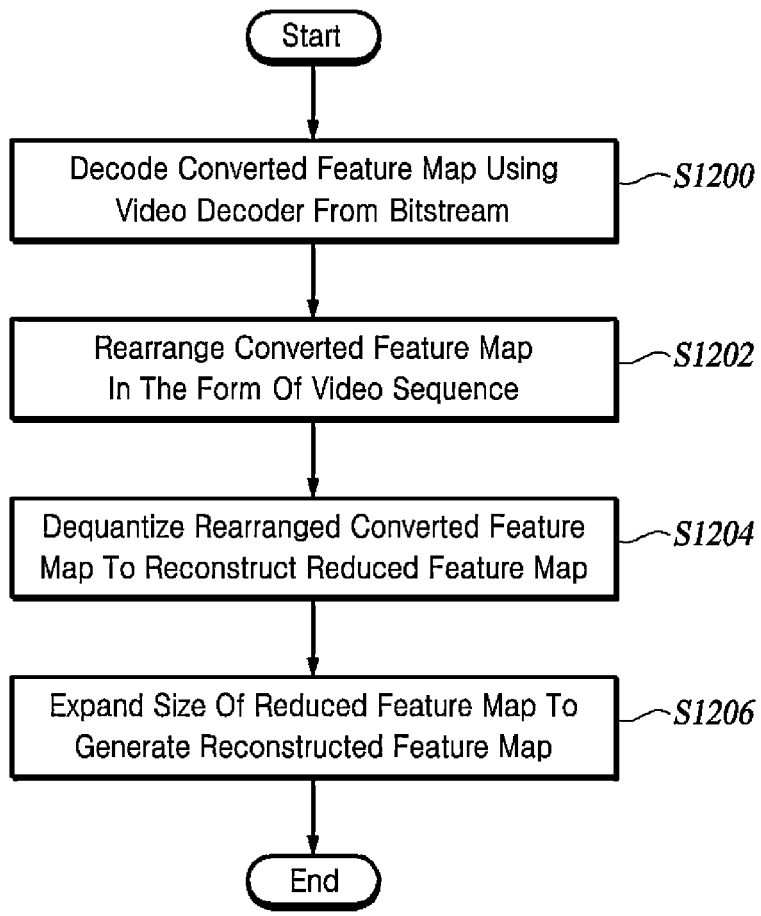
FIG. 12 is a flowchart of a VCM decoding method utilizing intermediate feature map reconstruction, according to at least one embodiment of the present disclosure.

Referring now to FIGS. 11 and 12, a VCM encoding method utilizing intermediate deep feature map reduction and a VCM decoding method utilizing intermediate deep feature map reconstruction are described.

FIG. 11 is a flowchart of a VCM encoding method utilizing intermediate deep feature map reduction, according to at least one embodiment of the present disclosure.

The VCM encoding apparatus extracts a feature map from an input image using a deep learning model (S1100). Here, the feature map represents an intermediate deep feature map generated from an intermediate layer of the deep learning model. The feature map includes as many 2D feature maps with the same height and width as there are channels.

The VCM encoding apparatus reduces the size of the feature map to generate a reduced feature map (S1102).

The VCM encoding apparatus reduces the size of the feature map based on feature map sparsification in terms of space or channels of the feature map. Alternatively, the VCM encoding apparatus may reduce the feature map based on tensor decomposition. By using these two methods separately or simultaneously, the VCM encoding apparatus can maximize feature map reduction. Furthermore, when the two methods are used together, no restrictions are put on the order in which they are used.

To exploit the sparsity in terms of space of the feature map, the VCM encoding apparatus compares to a preset threshold the feature values of regions within the 2D feature map constituting the feature map. If the feature value is less than the preset threshold, the feature value of the corresponding region may be set to zero.

In another embodiment, to exploit the sparsity in terms of channels of the feature map, the VCM encoding apparatus calculates a distance between two 2D feature maps having a preset channel stride. After selecting all pairs of 2D feature maps having the calculated distance less than the preset threshold, the VCM encoding apparatus, for each of the selected pairs, sparsifies all values of one 2D feature map to zero or deletes one 2D feature map.

Meanwhile, using the Tucker decomposition among other tensor decomposition methods, the VCM encoding apparatus may decompose the feature map into one kernel tensor and three factor matrices. In this case, the feature map may be approximated by one kernel tensor and three factor matrices, as shown in Equation 1.

In another embodiment, using the CP decomposition among the tensor decomposition methods, the VCM encoding apparatus may decompose the feature map into P rank 1 tensors. In this case, the feature map may be approximated based on the P rank 1 tensors, as shown in Equation 3.

The VCM encoding apparatus quantizes the reduced feature map to convert the data type of the reduced feature map (S1104).

The VCM encoding apparatus rearranges the quantized feature map in the form of a video sequence to generate the converted feature map (S1106).

The VCM encoding apparatus encodes the converted feature map using a video encoder to generate a bitstream (S1108).

Meanwhile, when using the sparsity in terms of channels of the feature map, the VCM encoding apparatus generates the bitstream as follows. For a sparsified feature map, the VCM encoding apparatus may encode a 2D feature map and a preset channel stride and may transmit the encoded 2D feature map and the encoded preset channel stride to the VCM decoding apparatus. Alternatively, for a deleted feature map, the VCM encoding apparatus may encode the index of the deleted 2D feature map and a preset channel stride and may transmit the encoded index of the deleted 2D feature map and the encoded preset channel stride to the VCM decoding apparatus.

When using Tucker decomposition, the VCM encoding apparatus may encode each of the kernel tensor and the factor matrices to generate corresponding bitstreams and then may transmit the encoded kernel tensor and the encoded factor matrices to the VCM decoding apparatus.

When using CP decomposition, the VCM encoding apparatus may encode each of the P rank 1 tensors to generate corresponding bitstreams and then may transmit them to the VCM decoding apparatus.

In another embodiment of utilizing CP decomposition, the VCM encoding apparatus may generate tensors that combine rank 1 tensors of the same size. The VCM encoding apparatus may encode these tensors to generate corresponding bitstreams and then may transmit the encoded tensors to the VCM decoding apparatus.

FIG. 12 is a flowchart of a VCM decoding method utilizing intermediate deep feature map reconstruction, according to at least one embodiment of the present disclosure.

Here, the intermediate deep feature map represents a feature map generated from an intermediate layer of a deep learning model in the machine vision encoding apparatus. The feature map includes as many 2D feature maps having the same height and width as the number of channels.

The VCM decoding apparatus decodes the converted feature map using a video decoder from the bitstream (S1200).

On the other hand, when the reduced feature map is reduced based on the feature map sparsification in terms of channels, the VCM decoding apparatus decodes the bitstream as follows. For the sparsified 2D feature map, the VCM decoding apparatus decodes the preset channel stride and the sparsified 2D feature map. Alternatively, for a deleted 2D feature map, the VCM decoding apparatus decodes the preset channel stride and the index of the deleted 2D feature map.

The VCM decoding apparatus rearranges the converted feature map in the form of a video sequence (S1202).

The VCM decoding apparatus dequantizes the rearranged converted feature map to convert the data type of the rearranged converted feature map and thus reconstructs the reduced feature map (S1204).

The VCM decoding apparatus expands the size of the reduced feature map to generate a reconstructed feature map (S1206). Here, the reconstructed feature map corresponds to the intermediate deep feature map described above.

When the reduced feature map is reduced based on the feature map sparsification in terms of channels, the VCM decoding apparatus generates a reconstructed feature map as follows. For the sparsified 2D feature map, the VCM decoding apparatus may generate the reconstructed feature map by copying the reconstructed 2D feature map before or after a preset channel stride to the location of the sparsified 2D feature map. Alternatively, for the deleted 2D feature map, the VCM decoding apparatus may generate the reconstructed feature map by copying, with reference to the decoded index, the reconstructed 2D feature map before or after the preset channel stride to the location of the deleted 2D feature map.

In another embodiment, when the reduced feature map is reduced by using Tucker decomposition, the VCM decoding apparatus may approximate the reconstructed feature map by using the kernel tensor and factor matrices constituting the reduced feature map, as shown in Equation 1.

In yet another embodiment, when the reduced feature map is reduced by using CP decomposition, the VCM decoding apparatus may approximate the reconstructed feature map by using P rank 1 tensors constituting the reduced feature map, as shown in Equation 3.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

(Reference Numerals)

| | |
|---|---|
| 410: feature extractor | 420: feature converter |
| 430: feature encoder | 450: feature decoder |
| 460: feature inverse converter | 512: feature reducer |
| 612: feature reconstructor | |

What is claimed is:

1. An encoding method performed by a machine vision encoding apparatus for encoding a feature map, the encoding method comprising:

extracting the feature map from an input image using a deep learning model, wherein the feature map is generated from an intermediate layer of the deep learning model;

generating a reduced feature map by reducing a size of the feature map;

generating a converted feature map by converting a data type of the reduced feature map and rearranging the reduced feature map; and generating a bitstream by encoding the converted feature map using a video encoder.

2. The encoding method of claim 1, wherein the feature map comprises:

as many 2D feature maps having an equal height and an equal width as there are channels.

3. The encoding method of claim 1, wherein generating the reduced feature map comprises:

reducing the feature map based on a feature map sparsification in terms of space or channels of the feature map.

4. The encoding method of claim 3, wherein generating the reduced feature map comprises:

reducing the feature map with the feature map sparsification and a tensor decomposition combined.

5. The encoding method of claim 3, wherein generating the reduced feature map comprises:

when a 2D feature map constituting the feature map has a region with a feature value that is less than a preset threshold, setting the feature value of the region to zero.

6. The encoding method of claim 3, wherein generating the reduced feature map comprises:

calculating a distance between two 2D feature maps having a preset channel stride;

selecting all pairs of 2D feature maps having a distance that is less than a preset threshold; and for each of the selected all pairs, sparsifying all values of one 2D feature map to zero or deleting the one 2D feature map.

7. The encoding method of claim 6, wherein generating the bitstream comprises:

encoding a sparsified 2D feature map and the preset channel stride when the one 2D feature map is sparsified; or when the one 2D feature map is deleted, encoding an index of the deleted 2D feature map and the preset channel stride.

8. The encoding method of claim 1, wherein generating the reduced feature map comprises:

reducing the feature map based on tensor decomposition.

9. The encoding method of claim 8, wherein generating the reduced feature map comprises:

decomposing the feature map into one kernel tensor and three factor matrices by using a Tucker decomposition.

10. The encoding method of claim 8, wherein generating the reduced feature map comprises:

decomposing the feature map into P rank 1 tensors (wherein P is a natural number) by using a Canonical Polyadic (CP) decomposition.

11. A decoding method performed by a machine vision decoding apparatus, the decoding method comprising:

decoding a converted feature map using a video decoder from a bitstream;

reconstructing a reduced feature map by rearranging the converted feature map and by converting a data type of the rearranged converted feature map; and generating a reconstructed feature map by expanding a size of the reduced feature map, wherein the reconstructed feature map corresponds to a feature map generated from an intermediate layer of a deep learning model in a machine vision encoding apparatus.

12. The decoding method of claim 11, wherein the reconstructed feature map comprises:

as many 2D feature maps having an equal height and an equal width as there are channels.

13. The decoding method of claim 11, further comprising:

decoding a preset channel stride and a sparsified 2D feature map, or decoding the preset channel stride and an index of a deleted 2D feature map, when the reduced feature map is reduced based on feature map sparsification in terms of channels.

14. The decoding method of claim 13, wherein generating the reconstructed feature map comprises:

with respect to the sparsified 2D feature map, generating the reconstructed feature map by copying a reconstructed 2D feature map before or after the preset channel stride to a location of the sparsified 2D feature map, or with respect to the deleted 2D feature map, copying, with reference to a decoded index, a reconstructed 2D feature map before or after the preset channel stride to a location of the deleted 2D feature map.

15. The decoding method of claim 11, wherein generating the reconstructed feature map comprises:

when the reduced feature map has been reduced by using a Tucker decomposition, generating the reconstructed feature map by using a kernel tensor and factor matrices constituting the reduced feature map.

16. The decoding method of claim 11, wherein generating the reconstructed feature map comprises:

when the reduced feature map has been reduced by using a Canonical Polyadic (CP) decomposition, generating the reconstructed feature map by using P rank 1 tensors (wherein P is a natural number) constituting the reduced feature map.

17. A computer-readable recording medium storing a bitstream generated by a machine vision encoding method for encoding a feature map, the machine vision encoding method comprising:

extracting the feature map from an input image using a deep learning model, wherein the feature map is generated from an intermediate layer of the deep learning model;

generating a reduced feature map by reducing a size of the feature map;

generating a converted feature map by converting a data type of the reduced feature map and rearranging the reduced feature map; and generating a bitstream by encoding the converted feature map using a video encoder.

* * * * *